United States Patent [19]

Boteler

[11] Patent Number: 5,793,587
[45] Date of Patent: Aug. 11, 1998

[54] DUAL TRIP LEVEL GROUND FAULT INTERRUPTER

[75] Inventor: William C. Boteler, Bridgeport, Conn.

[73] Assignee: Hubbell Incorporated, Orange, Conn.

[21] Appl. No.: 912,782

[22] Filed: Aug. 18, 1997

[51] Int. Cl.⁶ .................................................. H02H 3/00
[52] U.S. Cl. .................. 361/42; 361/44; 361/45; 361/87
[58] Field of Search .................. 361/42, 44, 45, 361/46, 47, 48, 50, 78, 87

[56] References Cited

U.S. PATENT DOCUMENTS

| | | | |
|---|---|---|---|
| 3,898,529 | 8/1975 | Reenstra | 361/46 |
| 3,953,766 | 4/1976 | Howell et al. | 361/46 |
| 3,973,171 | 8/1976 | Howell | 361/46 |
| 4,024,436 | 5/1977 | Adams | 361/45 |
| 4,156,884 | 5/1979 | Eckart et al. | 361/46 |
| 4,208,688 | 6/1980 | Misencik et al. | 361/44 |
| 4,233,640 | 11/1980 | Klein et al. | 361/44 |

Primary Examiner—Jefffrey A. Gaffin
Assistant Examiner—Kim N. Huynh
Attorney, Agent, or Firm—Jerry M. Presson; William C. Roch

[57] ABSTRACT

A dual trip level ground fault interrupter (GFI) which is designed to trip or operate at a first relatively low personnel protection level of ground leakage current, and also at a second relatively high equipment protection level of grounded leakage current. The dual trip level ground fault interrupter is provided for a power line, having line conductors and a ground conductor, supplying electrical power to a load. The dual trip level GFI comprises first and second differential current transformers, each having a primary winding and a secondary winding. All of the line conductors for the load pass through the primary winding of the first differential current transformer. All of the line conductors and the ground conductor pass through the primary winding of the second differential transformer. The ground conductor does not pass through the primary winding of the first differential current transformer. The first differential current transformer responds to the total ground leakage current, and is wound to achieve a trip voltage at a high equipment protection level of ground leakage current (e.g. 30 ma). The second differential current transformer responds to any leakage current not returning on the ground conductor, and is wound to achieve trip voltage at a lower personnel protection level of ground leakage (e.g. 5 ma).

13 Claims, 2 Drawing Sheets

SINGLE PHASE

DUAL TRIP LEVEL GROUND FAULT INTERRUPTER

BACKGROUND OF THE INVENTION

1. Field of the Invention

The present invention relates generally to a dual trip level ground fault interrupter (GFI), and more particularly pertains to a dual trip level ground fault interrupter which is designed to trip or operate at a first relatively low personnel protection level of a ground leakage current and also at a second relatively high equipment protection level of ground leakage current.

2. Discussion of the Prior Art

The present invention relates to a ground fault circuit interrupter (GFCI) for protecting an AC load circuit. Conventional GFCI devices are designed to trip in response to the detection of a ground fault condition at an AC load. Generally, the ground fault condition results when a person comes into contact with the line side of the AC load and an earth ground at the same time, a situation which can result in serious injury, or when there is a fault between the line side of the AC supply and the equipment ground, which can result in costly damage to the equipment or to the supply. The GFCI device detects this condition by using a sensing transformer to detect an imbalance between the currents flowing in the line and neutral conductors of the AC supply, as will occur when some of the current on the line side is being diverted to ground. When such an imbalance is detected, a circuit breaker within the GFCI device is immediately tripped to an open condition, thereby opening both sides of the AC line and removing all power from the load.

Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differential current when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building.

Portable GFCI devices have also been designed for use in situations where the available AC power supply circuit does not include a central or receptacle-type GFCI device. These portable devices may be incorporated into line cords, extension cords or plug-in units, and are often used with power tools and other types of potentially hazardous power equipment at construction sites and the like.

Personnel protection Ground Fault Interrupters (GFIs) are designed to open at relatively low levels of ground or earth leakage current (e.g., 5 ma), and consequently may be subject to frequent nuisance tripping due to capacitive or conductive leakage currents to the frame of grounded equipment (e.g. a swimming pool pump motor). This type of leakage current is not hazardous to personnel.

Equipment protection ground fault interrupters are designed to open at higher levels of ground or earth leakage current (e.g. 30 ma or more), and consequently are less subject to such nuisance tripping.

SUMMARY OF THE INVENTION

Accordingly, it is a primary object of the present invention to provide a dual trip level ground fault interrupter.

A further object of the subject invention is the provision of a GFI which is designed to trip or operate at a first relatively low personnel protection level of ground leakage current, and also at a second relatively high equipment protection level of grounded leakage current.

In accordance with the teachings herein, the present invention provides a dual trip level ground fault interrupter for a power line, having line conductors and a ground conductor, supplying electrical power to a load. The dual trip level GFI comprises first and second differential current transformers, each having a primary winding and a secondary winding. All of the line conductors for the load pass through the primary winding of the first differential current transformer. All of the line conductors and the ground conductor pass through the primary winding of the second differential transformer. The ground conductor does not pass through the primary winding of the first differential current transformer. The first differential current transformer responds to the total ground leakage current, and is wound to achieve a trip voltage at a high equipment protection level of ground leakage current (e.g. 30 ma). The second differential current transformer responds to any leakage current not returning on the ground conductor, and is wound to achieve trip voltage at a lower personnel protection level of ground leakage current (e.g. 5 ma).

In greater detail, one of the line conductors can comprise a neutral conductor. The line conductors can supply single phase power, or can supply poly phase power. The secondary winding of the first differential current transformer is wound to produce a trip voltage to operate a controller to open a ground fault interrupter switch at a high equipment protection level of leakage current. Likewise, the secondary winding of the second differential current transformer is wound to produce a trip voltage to operate the controller (or a separate controller) to open the ground fault interrupter at a lower personnel protection level of leakage current.

BRIEF DESCRIPTION OF THE DRAWINGS

The foregoing objects and advantages of the present invention for a dual trip level ground fault interrupter may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Personnel protection Ground Fault Interrupters (GFIs) are designed to open at relatively low levels of ground or earth leakage current (e.g., 5 ma), and consequently may be subject to nuisance tripping due to capacitive or conductive leakage currents to the frame of grounded equipment (e.g. a swimming pool pump motor). This type of leakage current is not hazardous to personnel.

Equipment protection ground fault interrupters are designed to open at higher levels of ground or earth leakage current (e.g. 30 ma or more), and consequently are less subject to such nuisance tripping.

Figure 1:
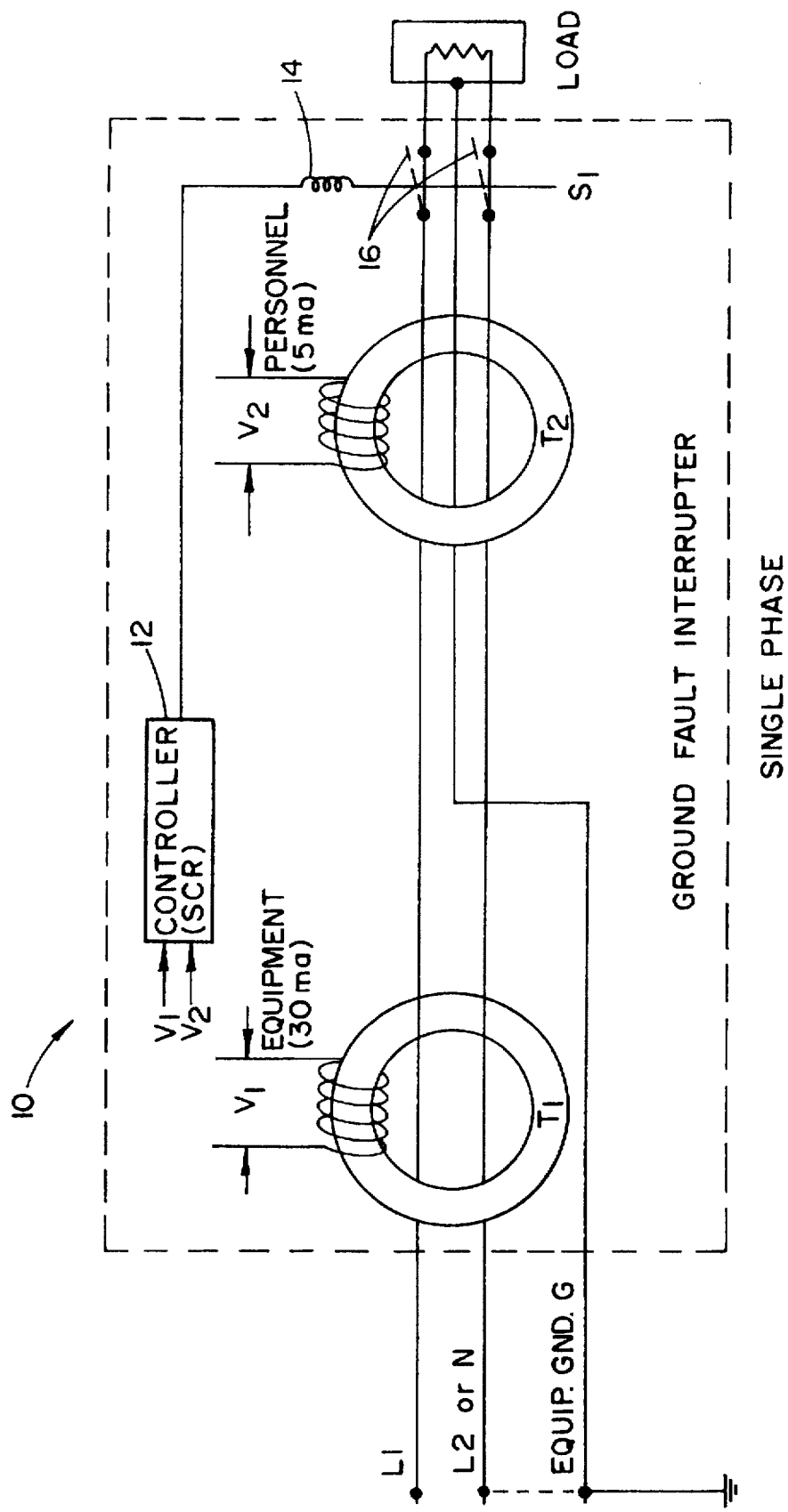
FIG. 1 illustrates a schematic wiring diagram for a dual trip level ground fault interrupter pursuant to the present invention for a single phase wiring arrangement.

Referring to the drawings in detail, FIG. 1 illustrates a schematic wiring diagram for a dual trip level ground fault interrupter 10 pursuant to the present invention for a single phase wiring arrangement. The ground fault interrupter of the present invention incorporates two differential current transformers T1 and T2 to provide a dual trip level GFI.

All of the line conductors L1, L2, or the neutral conductor N for a load pass through the primary winding of the first differential current transformer T1, and also pass through the primary winding of the second differential transformer T2. Additionally, the equipment grounding conductor G only passes through the primary winding of the second differential transformer T2 (and not through the primary winding of the first differential current transformer T1).

The second differential current transformer T2 is wound to achieve trip voltage at a personnel protection level (e.g. 5 ma).

The first differential current transformer T1 is wound to achieve trip voltage at a higher equipment protection level (e.g. 30 ma or more).

In the present invention, the second differential current transformer $T_2$ responds to any leakage current not returning on the equipment ground path. The secondary winding of the second differential current transformer $T_2$ may be wound to produce the trip voltage required at $V_2$ to operate a controller 12 (e.g. an SCR) to open the dual contacts of switch $S_1$, at the personnel protection ground or earth leakage current level.

The first differential current transformer T, responds to the total ground or earth leakage current. The secondary winding of the first differential current transformer $T_1$ may be wound to produce the trip voltage required at $V_1$ to operate the same controller 12 (or possibly a different controller) to open the contacts of switch $S_1$, at a higher, equipment protection level of leakage current.

The transformers T1 and T2 are typical GFI balanced differential toroidal transformers wherein the conductors L1, L2 or N, and G only pass through the transformer primary as shown.

In balanced transformer T1 if the AC current on line L1 is equal to the AC current on line L2 (or N), which indicates no current G to ground, then the vector sum of the currents is zero and the transformer is in balance.

Likewise, in balanced transformer T2, if all of the leakage current IL passes through the equipment ground G, the vector sum of the currents L1, L2, N, and G is zero and the primary winding of the transformer T2 is in balance. However, assume a situation wherein a person is touching the frame of the load and a portion of the leakage current IL flows through the person to ground and not through G. In that situation, the primary winding transformer T2 is out of balance, and the secondary winding of transformer T2 produces an output V2. If the leakage current flowing through the person to ground exceeds 5 ma, then the output V2 is sufficient to operate a controller 12 for a relay 14 operated switch S1 to open the dual contacts therein.

Newer types of GFCI devices employ relays, rather than circuit breakers or other types of mechanical latching devices, to interrupt the load power when a ground fault condition occurs. An electronic circuit switch such as an SCR controls the flow of current to a relay coil, and the relay coil serves to open contacts 16 on both sides of the AC line in response to the presence of a ground fault condition. In these devices, only a simple momentary push-button switch is needed to perform the reset function, since the latching is performed electronically rather than mechanically.

For the exemplary embodiment described hereinabove, the number of turns on the secondary winding of transformer T1 is chosen to produce an output at 30 ma sufficient to trip the relay, and the number of turns on the secondary winding of transformer T2 is chosen to produce an output at 5 ma, which can be achieved by a number of windings ratio of T1/T2 of 6/1.

Figure 2:
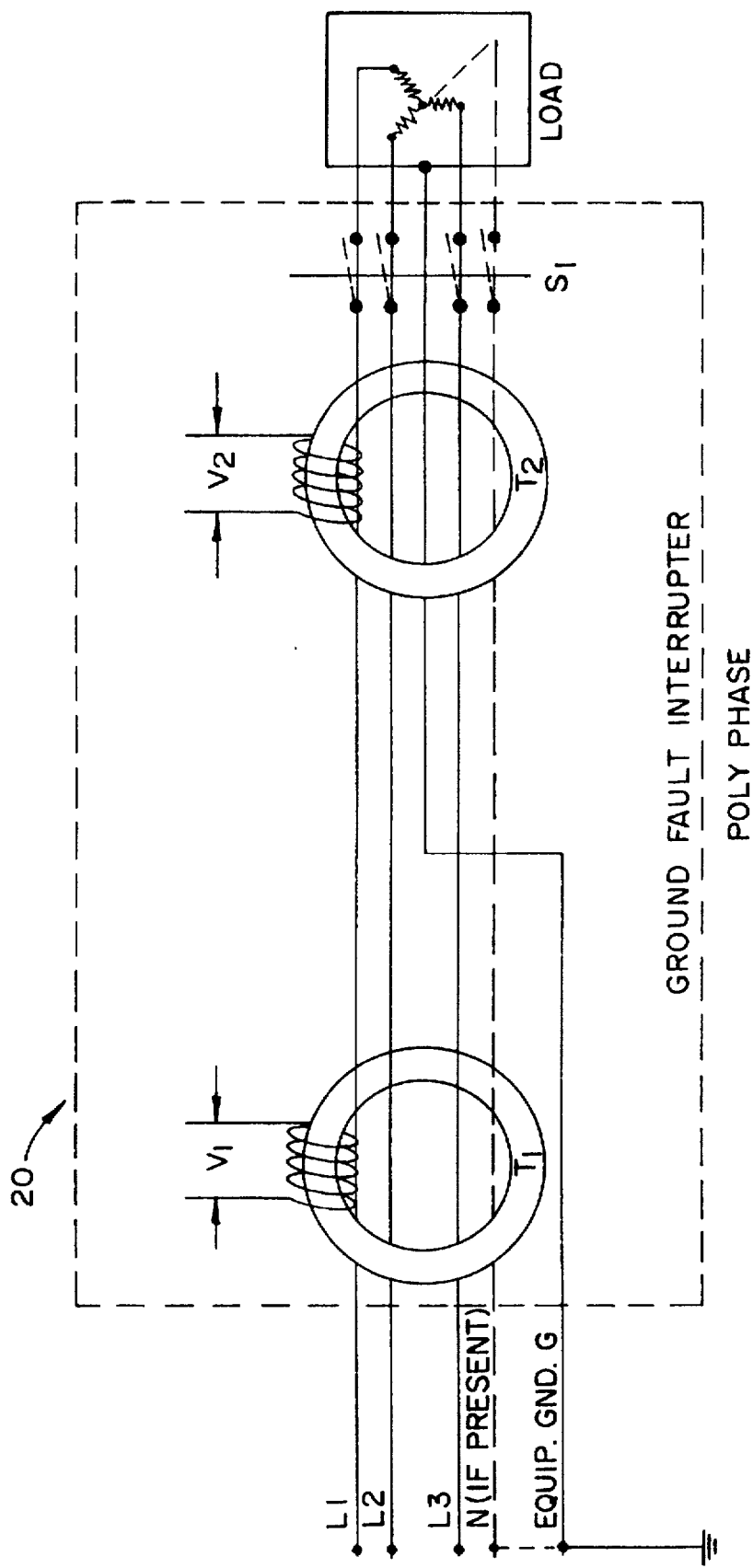
FIG. 2 illustrates a schematic wiring diagram for a dual trip level ground fault interrupter pursuant to the present invention for a poly phase wiring arrangement.

FIG. 2 illustrates a schematic wiring diagram for a dual trip level ground fault interrupter 20 pursuant to the present invention for a poly phase wiring arrangement, which operates in substantially the same manner as the single phase dual trip level GFI 10 of FIG. 1, but includes an additional line conductor L3.

While several embodiments and variations of the present invention for a dual trip level ground fault interrupter are described in detail herein, it should be apparent that the disclosure and teachings of the present invention will suggest many alternative designs to those skilled in the art.

What is claimed is:

1. A dual trip level ground fault interrupter for a power line, having line conductors and a ground conductor, supplying electrical power to a load, comprising:
   a. first and second differential current transformers, each having a primary winding and a secondary winding;
   b. all of the line conductors for the load pass through the primary winding of the first differential current transformer;
   c. all of the line conductors and the ground conductor pass through the primary winding of the second differential transformer, and the ground conductor does not pass through the primary winding of the first differential current transformer;
   d. the first differential current transformer responds to the total ground or earth leakage current, and is wound to achieve a trip voltage at a high equipment protection level of ground leakage current;
   e. the second differential current transformer responds to any leakage current not returning on the ground conductor, and is wound to achieve trip voltage at a lower personnel protection level of ground leakage current, lower relative to the high equipment protection level of ground leakage current.

2. A dual trip level ground fault interrupter as claimed in claim 1, wherein one of the line conductors comprises a neutral conductor.

3. A ground fault interrupter as claimed in claim 2, wherein the line conductors supply single phase power.

4. A ground fault interrupter as claimed in claim 2, wherein the line conductors supply poly phase power.

5. A ground fault interrupter as claimed in claim 2, wherein the secondary winding of the first differential current transformer is wound to produce a trip voltage to operate a controller to open a ground fault interrupter switch at a high equipment protection level of leakage current.

6. A ground fault interrupter as claimed in claim 5, wherein the secondary winding of the second differential current transformer is wound to produce a trip voltage to operate the controller to open the ground fault interrupter at a lower personnel protection level of leakage current.

7. A ground fault interrupter as claimed in claim 2, wherein the secondary winding of the second differential current transformer is wound to produce a trip voltage to operate a controller to open the ground fault interrupter switch at a lower, personnel protection level of leakage current.

8. A dual trip level ground fault interrupter as claimed in claim 1, wherein the line conductors supply single phase power.

9. A dual trip level ground fault interrupter as claimed in claim 1, wherein the line conductors supply poly phase power.

10. A dual trip level ground fault interrupter as claimed in claim 1, wherein the secondary winding of the first differential current transformer is wound to produce a trip voltage to operate a controller to open a ground fault interrupter switch at a high equipment protection level of leakage current.

11. A ground fault interrupter as claimed in claim 10, wherein the secondary winding of the second differential current transformer is wound to produce a trip voltage to operate the controller to open the ground fault interrupter at a lower personnel protection level of leakage current.

12. A ground fault interrupter as claimed in claim 10, wherein the secondary winding of the second differential current transformer is wound to produce a trip voltage to operate a second controller to open the ground fault interrupter switch at a lower, personnel protection level of leakage current.

13. A ground fault interrupter as claimed in claim 1, wherein the secondary winding of the second differential current transformer is wound to produce a trip voltage to operate a controller to open the ground fault interrupter at a lower personnel protection level of leakage current.

* * * * *

UNITED STATES PATENT AND TRADEMARK OFFICE
CERTIFICATE OF CORRECTION

PATENT NO. : 5,793,587
DATED : August 11, 1998
INVENTOR(S) : William C. Boteler

It is certified that error appears in the above-identified patent and that said Letters Patent is hereby corrected as shown below:

On the title page, under item [56] Reference Cited, insert -- 5,418,678  5/1995  McDonald --.

Signed and Sealed this

Seventeenth Day of November, 1998

Attest:

BRUCE LEHMAN

Attesting Officer

Commissioner of Patents and Trademarks